United States Patent
Jung et al.

(10) Patent No.: US 11,174,783 B2
(45) Date of Patent: Nov. 16, 2021

(54) HIGH-EFFICIENCY POWER GENERATION SYSTEM

(71) Applicant: HANWHA POWER SYSTEMS CO., LTD, Changwon-si (KR)

(72) Inventors: Se Hwan Jung, Changwon-si (KR); Bong Gun Shin, Changwon-si (KR)

(73) Assignee: HANWHA POWER SYSTEMS CO., LTD, Changwon-si (KR)

(*) Notice: Subject to any disclaimer, the term of this patent is extended or adjusted under 35 U.S.C. 154(b) by 615 days.

(21) Appl. No.: 15/875,120

(22) Filed: Jan. 19, 2018

(65) Prior Publication Data

US 2019/0063315 A1 Feb. 28, 2019

(30) Foreign Application Priority Data

Aug. 23, 2017 (KR) .......................... 10-2017-0106469

(51) Int. Cl.
*F02C 7/36* (2006.01)
*F02C 3/20* (2006.01)
(Continued)

(52) U.S. Cl.
CPC .................. *F02C 3/20* (2013.01); *F02C 1/08* (2013.01); *F02C 1/10* (2013.01); *F02C 3/10* (2013.01);
(Continued)

(58) Field of Classification Search
CPC ........ F01K 25/103; F01K 25/00; F01K 25/10; F02C 7/36; F02C 7/32; F02C 1/08; F02C 1/10
See application file for complete search history.

(56) References Cited

U.S. PATENT DOCUMENTS

| 4,437,627 A * | 3/1984 | Moorehead ............ B64D 27/18 244/11 OB |
| 8,490,411 B2 * | 7/2013 | Suciu ........................ F02C 7/32 60/788 |

(Continued)

FOREIGN PATENT DOCUMENTS

| JP | 2007-332826 A | 12/2007 |
| KR | 10-2013-0004339 A | 1/2013 |

(Continued)

OTHER PUBLICATIONS

Laurens Valk, "The Lego Mindstorms EV3 Discovery Book", 2014 (Year: 2014).*

(Continued)

*Primary Examiner* — Todd E Manahan
*Assistant Examiner* — Thuyhang N Nguyen
(74) *Attorney, Agent, or Firm* — Sughrue Mion, PLLC

(57) ABSTRACT

A high-efficiency power generation system includes: a combustor configured to generate a circulating fluid by burning a fuel; an expander configured to generate power by expanding the circulating fluid; a power generator configured to generate electricity using the power generated by the expander; a compressor configured to compress the expanded circulating fluid; a pump configured to circulate the compressed circulating fluid; a heat exchanger configured to allow the expanded circulating fluid passing through the expander and the compressed circulating fluid passing through the compressor to exchange heat with each other; and a power transmitter including a driving shaft, and configured to rotate a driven shaft, which includes shafts of the compressor and the pump, to transmit the power generated by the expander to the compressor and the pump.

13 Claims, 10 Drawing Sheets

(51) Int. Cl.
*F02C 3/10* (2006.01)
*F02C 9/18* (2006.01)
*F02C 1/08* (2006.01)
*F02C 1/10* (2006.01)
*F01D 15/10* (2006.01)
*F01D 15/08* (2006.01)
*F02C 7/12* (2006.01)

(52) U.S. Cl.
CPC ............. *F02C 7/36* (2013.01); *F02C 9/18* (2013.01); *F01D 15/08* (2013.01); *F01D 15/10* (2013.01); *F02C 7/12* (2013.01); *F05D 2210/12* (2013.01); *F05D 2220/32* (2013.01); *F05D 2240/35* (2013.01); *F05D 2260/4031* (2013.01)

(56) References Cited

U.S. PATENT DOCUMENTS

| | | | | |
|---|---|---|---|---|
| 8,596,075 | B2 * | 12/2013 | Allam | F25J 3/04533 60/772 |
| 8,745,991 | B2 * | 6/2014 | Kim | F01D 15/10 60/796 |
| 8,857,186 | B2 * | 10/2014 | Held | F01K 25/08 60/655 |
| 2013/0033044 | A1 * | 2/2013 | Wright | F02C 1/10 290/1 R |
| 2013/0139509 | A1 * | 6/2013 | Berti | F01K 13/00 60/648 |
| 2016/0201567 | A1 * | 7/2016 | Duong | F02C 3/04 60/796 |
| 2017/0306847 | A1 * | 10/2017 | Suciu | F02C 7/32 |
| 2018/0283281 | A1 * | 10/2018 | Veilleux, Jr. | F01D 15/12 |

FOREIGN PATENT DOCUMENTS

| | | |
|---|---|---|
| KR | 10-2013-0036180 A | 4/2013 |
| KR | 10-2015-0017610 A | 2/2015 |
| KR | 10-2015-0037411 A | 4/2015 |
| KR | 10-2016-0123278 A | 10/2016 |
| KR | 10-2017-0075097 A | 7/2017 |

OTHER PUBLICATIONS

Communication dated May 25, 2021, issued by the Korean Intellectual Property Office in Korean Patent Application No. 10-2017-0106469.

* cited by examiner

HIGH-EFFICIENCY POWER GENERATION SYSTEM

CROSS-REFERENCE TO THE RELATED APPLICATION

This application claims priority from Korean Patent Application No. 10-2017-0106469, filed on Aug. 23, 2017, and all the benefits accruing therefrom under 35 U.S.C. § 119, the disclosure of which is incorporated herein by reference in its entirety.

BACKGROUND

1. Field

Apparatuses and methods consistent with exemplary embodiment relate to a power generation system, and more particularly, to a method of improving energy efficiency of a power generation system which uses pure oxygen for combustion and supercritical carbon dioxide as a circulating fluid.

2. Description of the Related Art

In the Rankine cycle, steam is used as a circulating fluid. In a Rankine cycle power generation system, water is compressed and then heated to produce high-temperature steam, the high-temperature steam drives a turbine, and power of the turbine is used to generate electricity. The steam passing through the turbine is compressed and heated again, and this cycle is repeated.

Over the past century, many power generation systems have used the Rankine cycle. However, carbon dioxide, which is emitted when heating water using coal in the Rankine cycle, has long been considered a cause of global warming, and thus, the need of a new power generation system which is more efficient, and has less carbon dioxide emission, than the Rankine cycle has arisen.

Recently, a supercritical carbon dioxide cycle using supercritical carbon dioxide as a circulating fluid has attracted attention as a thermal cycle to replace the Rankine cycle. The critical point of water is 374° C./221 atm, whereas the critical point of carbon dioxide is 31° C./73 atm. Accordingly, supercritical carbon dioxide can be produced at a relatively low temperature and pressure.

Since in the supercritical carbon dioxide cycle, dense high-temperature supercritical carbon dioxide is used to turn a power generation turbine, the supercritical carbon dioxide cycle consumes less energy in a compression step than a conventional thermal cycle using steam. Also, since energy density of carbon dioxide supplied to the turbine is high, a size of a power generation facility can be reduced to ⅕ of a gas turbine or 1/20 of a steam turbine, and as a result, production costs of a power generation facility can be reduced. Also, since supercritical carbon dioxide is circulated in a closed structure, emission of carbon dioxide can be significantly reduced.

FIG. 1 shows a power generation system to which the supercritical carbon dioxide cycle is applied. Referring to FIG. 1, a combustor 11 burns a fuel with pure oxygen to produce supercritical carbon dioxide. The supercritical carbon dioxide turns a turbine in an expander 12, is compressed in a compressor 13, and continues to be circulated by a pump 14.

FIG. 2 shows a conventional method of transmitting power from an expander to a compressor and a pump in the power generation system of FIG. 1. First, in the expander, supercritical carbon dioxide turns a turbine so as to produce power, and a power generator produces electricity using the power generated by the turbine. Some of the produced electricity is used to drive a motor. The motor generates rotational power to drive the compressor and the pump.

Table 1 below shows mechanical loss and energy efficiency when the compressor and the pump are driven using the conventional method of FIG. 2.

TABLE 1

|  | Mechanical Loss | Energy Efficiency |
| --- | --- | --- |
| Expander |  | 90% |
| Power Generator | 3%~7% | 90% |
| Motor | 3%~7% | 90% |
| Compressor/Pump | 3%~7% | 80% |
| Total | 9%~21% | 58% |

Referring to Table 1, a mechanical energy loss of 3% to 7% occurs due to mechanical friction or the like during driving of the power generator by the turbine of the expander. Also, mechanical energy losses of 3% to 7% occur during the driving of the motor by the power generator and during the driving of the compressor/the pump by the motor, respectively. In sum, the driving of the expander, the power generator, the motor, and the compressor/the pump results in a total mechanical loss of 9% to 21%.

According to Table 1, the energy efficiencies of the expander, the power generator, and the motor are all 90%, and the energy efficiency of the compressor/the pump is 80%. Assuming that energy supplied to the expander is 1, 0.9 of the supplied energy remains past the expander because the expander operates at an energy efficiency of 90%, 0.81 of the supplied energy past the power generator, 0.73 of the supplied energy past the motor, and 0.58 of the supplied energy past the compressor/the pump. Accordingly, the energy efficiency of the entire power generation system is only 58% when the compressor/the pump is driven through the expander, the power generator, and the motor.

Therefore, the inventive concept provides a high-efficiency power generation system using a method capable of increasing energy efficiency by reducing mechanical loss.

SUMMARY

Exemplary embodiments of the inventive concept provide a high-efficiency power generation system which uses a supercritical carbon dioxide cycle, by reducing energy loss which may be generated during the transmission of power from an expander to a compressor and a pump.

However, the inventive concept is not restricted to those exemplary embodiments set forth herein. The above and other exemplary embodiments of the inventive concept will become more apparent to one of ordinary skill in the art to which the inventive concept pertains by referencing the detailed description of the exemplary embodiments given below.

According to an exemplary embodiment, there is provided a high-efficiency power generation system which may include: a combustor configured to generate a circulating fluid by burning a fuel; an expander configured to generate power by expanding the circulating fluid; a power generator configured to generate electricity using the power generated by the expander; a compressor configured to compress the expanded circulating fluid; a pump configured to circulate the compressed circulating fluid; a heat exchanger configured to allow the expanded circulating fluid passing through the expander and the compressed circulating fluid passing through the compressor to exchange heat with each other; and a power transmitter including a driving shaft, and configured to rotate a driven shaft, which includes shafts of the compressor and the pump, to transmit the power generated by the expander to the compressor and the pump.

The expander may include first and second expanders disposed at a rear end of the combustor, power generated by the first expander may be transmitted to the power generator, and power generated by the second expander may be transmitted to the compressor and the pump via the power transmitter.

Alternatively, the expander may include a first expander disposed at a rear end of the combustor and a second expander disposed at a rear end of the heat exchanger, power generated by the first expander may be transmitted to the power generator, and power generated by the second expander may be transmitted to the compressor and the pump via the power transmitter.

According to the aforementioned and other exemplary embodiments, since power is directly transmitted from an expander to a compressor and a pump without passing through a power generator and a motor, mechanical energy loss can be reduced, and the energy efficiency of an entire power generation system can be improved.

In addition, since power can be transmitted to the compressor and the pump in amounts required by the compressor and the pump, waste of energy can be minimized.

Moreover, since the second expander at the rear end of a heat exchanger lowers the temperature of a circulating fluid again, the energy efficiency of the entire power generation system can be enhanced because the lower the temperature of the circulating fluid flown into the compressor, the higher the energy efficiency of the power generation system.

Other features and exemplary embodiments may be apparent from the following detailed description, the drawings, and the claims.

BRIEF DESCRIPTION OF THE DRAWINGS

The above and other exemplary embodiments and features of the inventive concept will become more apparent by describing in detail exemplary embodiments thereof with reference to the attached drawings, in which.

DETAILED DESCRIPTION

Figure 1:
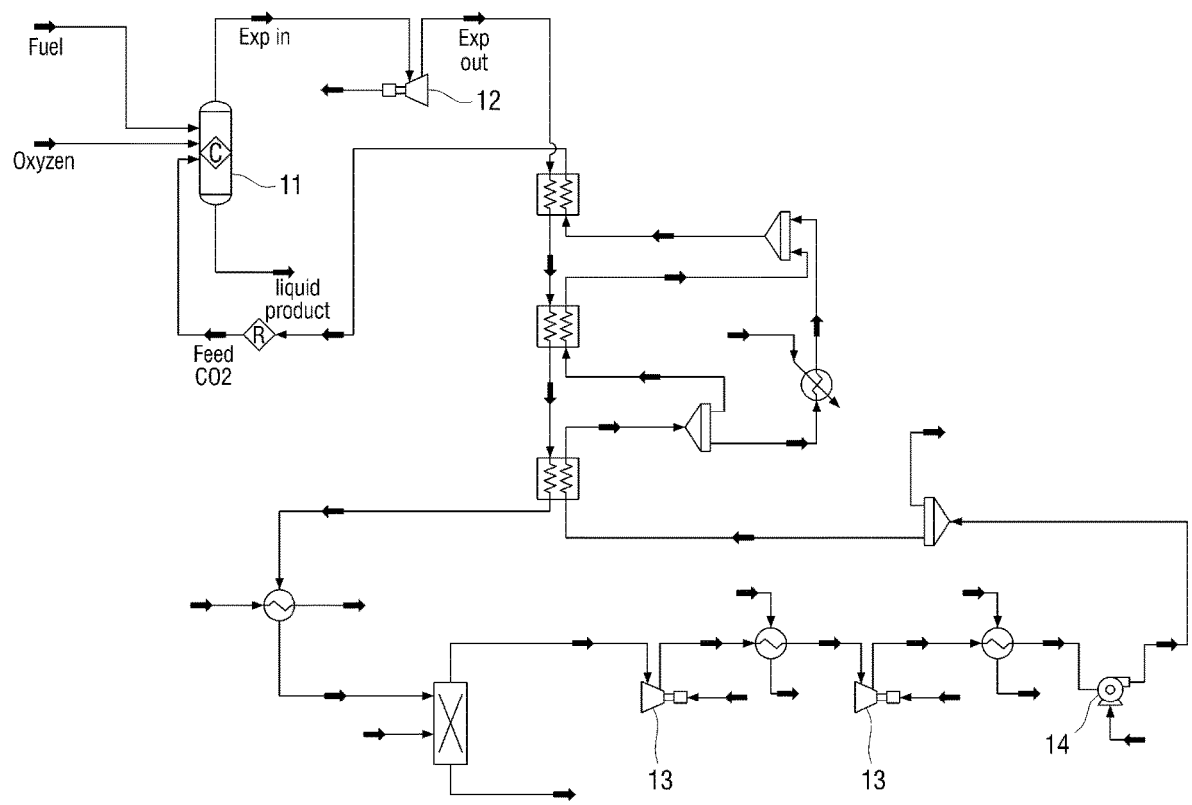
FIG. 1 is a schematic view illustrating a power generation system to which a supercritical carbon dioxide cycle is applied.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the exemplary embodiments set forth herein. Rather, these exemplary embodiments are provided so that this disclosure will be thorough and complete and will fully convey the inventive concept to those skilled in the art, and the inventive concept will only be defined within the scope of the appended claims. Reference will now be made in detail to exemplary embodiments of the inventive concept, examples of which are illustrated in the accompanying drawings. In the drawings, like reference numerals indicate like elements.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the inventive concept will hereinafter be described with reference to the accompanying drawings.

Figure 3:
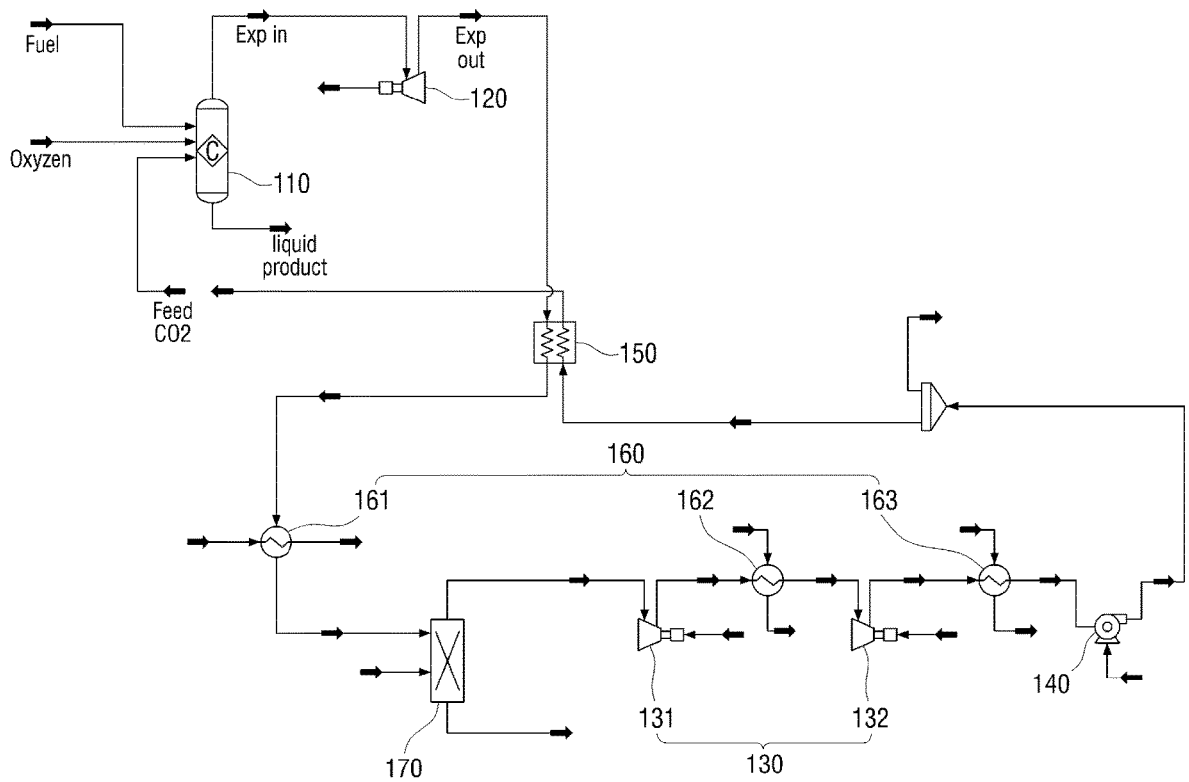
FIG. 3 is a schematic view illustrating a high-efficiency power generation system according to an exemplary embodiment.

FIG. 3 is a schematic view illustrating a high-efficiency power generation system according to an exemplary embodiment. Referring to FIG. 3, the high-efficiency power generation system includes a combustor 110, an expander 120, a power generator, a compressor 130, a pump 140, a heat exchanger 150, a water separator 170, and a power transmitter.

The combustor 110 burns a fuel using pure oxygen. An air separating unit (ASU) may be installed at a front end of the combustor 110, and the pure oxygen used in the combustion of the fuel may be pure oxygen separated by the ASU. Alternatively, an ASU and a pure oxygen compressor may be sequentially installed at the front end of the combustor 110, and the pure oxygen used in the combustion of the fuel may be pure oxygen separated by the ASU and compressed by the pure oxygen compressor.

Still alternatively, a pure oxygen compressor and a fuel compressor may be installed in parallel at the front end of the combustor 110. The fuel used in the combustor 110 may be a fuel compressed by the fuel compressor. The fuel used in the combustor 110 may comprise methane.

Carbon dioxide obtained by burning pure oxygen and the fuel in the combustor 110 may be used as a circulating fluid. The carbon dioxide may be supercritical carbon dioxide.

Since supercritical carbon dioxide is used as a circulating fluid, compression of the circulating fluid consumes less energy than when using steam, and a size of a turbine of the expander 120 can be reduced to ⅕ of a gas turbine or 1/20 of a steam turbine.

A high-temperature, high-pressure circulating fluid generated by the compressor 110 turns the turbine of the expander 120 and thereby generates power. A high-pressure circulating fluid turns the turbine and expands, causing its pressure to decrease.

In the heat exchanger 150, a high-temperature circulating fluid passing through the expander 120 and a high-pressure circulating fluid passing through the compressor 130 exchange heat with each other. FIG. 3 illustrates an example in which only one heat exchanger 150 is provided, but in another example, a plurality of heat exchangers 150 may be provided.

A cooler 160 may include a plurality of coolers, i.e., first, second, and third coolers 161, 162, and 163. The compressor 130 may include a plurality of compressors, i.e., first and second compressors 131 and 132.

The circulating fluid passing through the heat exchanger 150 is cooled first by the first cooler 161. The water separator 170 separates water from the circulating fluid passing through the first cooler 161. The circulating fluid passing through the water separator 170 may be compressed by the compressor 130.

In a case where the compressor 130 includes a plurality of compressors, the circulating fluid may be cooled again by the second cooler 162, and may then be compressed again by the second compressor 132. The circulating fluid passing through the second compressor 132 may be cooled yet again by the third cooler 163.

The circulating fluid compressed by the compressor 130 receives circulating power from the pump 140, exchanges heat with the circulating fluid passing through the expander 120 in the heat exchanger 150, and is injected into the combustor 110 for recirculation. Some of the circulating fluid receiving the circulating power may be collected by a collector for other purposes.

The power transmitter is a device for transmitting power to the compressor 130 and the pump 140. The transmission of power by the power transmitter will hereinafter be described with reference to FIG. 4.

Figure 2:
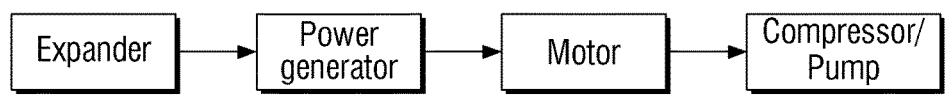
FIG. 2 is a schematic view illustrating a conventional method of transmitting power from an expander to a compressor and a pump in the power generation system of FIG. 1.
Figure 4:
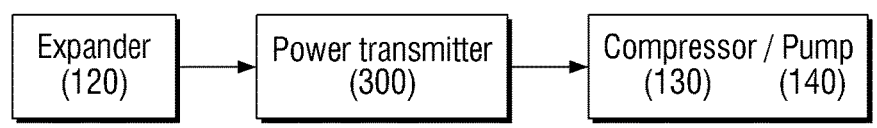
FIG. 4 is a schematic view illustrating a method of transmitting power from an expander to a compressor and a pump in the high-efficiency power generation system of FIG. 3, according to an exemplary embodiment.

FIG. 4 is a schematic view illustrating a method of transmitting power from the expander 120 to the compressor 130 and the pump 140vin the high-efficiency power generation system of FIG. 3. According to the conventional method of FIG. 2, power is transmitted from the expander 120 to the compressor 130 and the pump 140 via the power generator and the motor 140. Specifically, conventionally, rotational kinetic energy is converted into electrical energy while being transmitted from the expander 120 to the power generator, and the electrical energy is converted back into rotational kinetic energy while being transmitted from the power generator to a motor. Thus, mechanical loss increases, and energy efficiency decreases. On the other hand, in the exemplary embodiment of FIG. 4, in order to improve the conventional method of FIG. 2, power is transmitted from the expander 120 to the compressor 130 and the pump 140 via a power transmitter 300.

The power transmitter 300 has a rotating shaft of the expander 120, which rotates along with its turbine, as its driving shaft, and the rotating shafts of the compressor 130 and the pump 140 as its driven shaft, and can thus transmit power generated by the expander 120 directly to the compressor 130 and the pump 140 without changing the energy form of the power. Table 2 below shows mechanical loss and energy efficiency when the compressor 130 and the pump 140 are driven using the method of FIG. 4.

TABLE 2

|  | Mechanical Loss | Energy Efficiency |
| --- | --- | --- |
| Expander |  | 90% |
| Compressor/Pump | 3%~7% | 80% |
| Total | 3%~7% | 72% |

Referring to Tables 1 and 2, since the expander 120, the compressor 130, and the pump 140 are directly connected without passing through a power generator and a motor, mechanical losses of 3% to 7% that may have occurred between the expander 120 and the power generator, between the power generator and the motor, and between the motor and the compressor 130/the pump 140, respectively, otherwise can all be prevented. Therefore, the total mechanical loss of the entire high-efficiency power generation system according to the exemplary embodiment becomes 3% to 7%, which is the same as the mechanical loss between the expander 120 and the compressor 130/the pump 140.

Also, since the power generator and the motor are not used to drive the compressor 130 and the pump 140, energy loss that may have been caused otherwise because of the energy efficiencies of the power generator and the motor, which are 90%, can be reduced. Thus, the total energy efficiency of the entire high-efficiency power generation system according to the exemplary embodiment increases to 72%, into which only the energy efficiencies of the expander 120, the compressor 130, and the pump 140 are reflected.

In sum, the high-efficiency power generation system according to the exemplary embodiment can reduce mechanical loss that may be caused by the power generator and the motor and can increase energy efficiency. Thus, the high-efficiency power generation system according to the exemplary embodiment can be operated at high efficiency.

The structure of the power transmitter 300 will hereinafter be described with reference to FIGS. 5 through 9.

Figure 5:
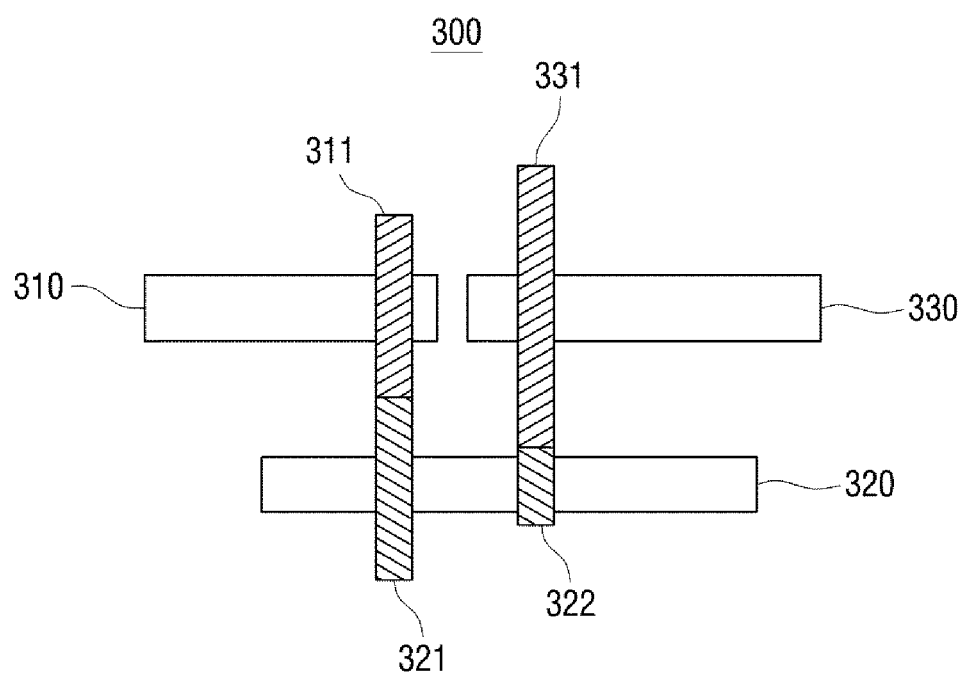
FIG. 5 is a schematic view illustrating a power transmitter according to an exemplary embodiment.

FIG. 5 illustrates a power transmitter 300 according to an exemplary embodiment. Referring to FIG. 5, the power transmitter 300 includes a driving shaft 310, a driving gear 311 mounted on the driving shaft 310, a driven shaft 330, a driven gear 331 mounted on the driven shaft 330, connecting gears 321 and 322 engaging between the driving gear 311 and the driven gear 331, and a connecting shaft 320 on which the connecting gears 321 and 322 are mounted.

The driving shaft 310 of the power transmitter 300 is a rotating shaft of an expander. As a turbine of the expander is rotated by a high-temperature, high-pressure circulating fluid generated in a combustor, the driving shaft 310 is rotated accordingly.

As the driving shaft 310 is rotated, the connecting gear 321, which engages with the driving gear 311, the driven gear 331, which engages with the connecting gear 321, and the driven shaft 330, on which the driven gear 331 is mounted, are rotated accordingly. The driven shaft 330 may be a rotating shaft of a compressor, and in response to the compressor being operated by the rotation of the driven shaft 330, power provided by the expander may be transmitted to the compressor. A pump may receive power from the expander in the same manner as the compressor via the power transmitter 300.

Figure 6:
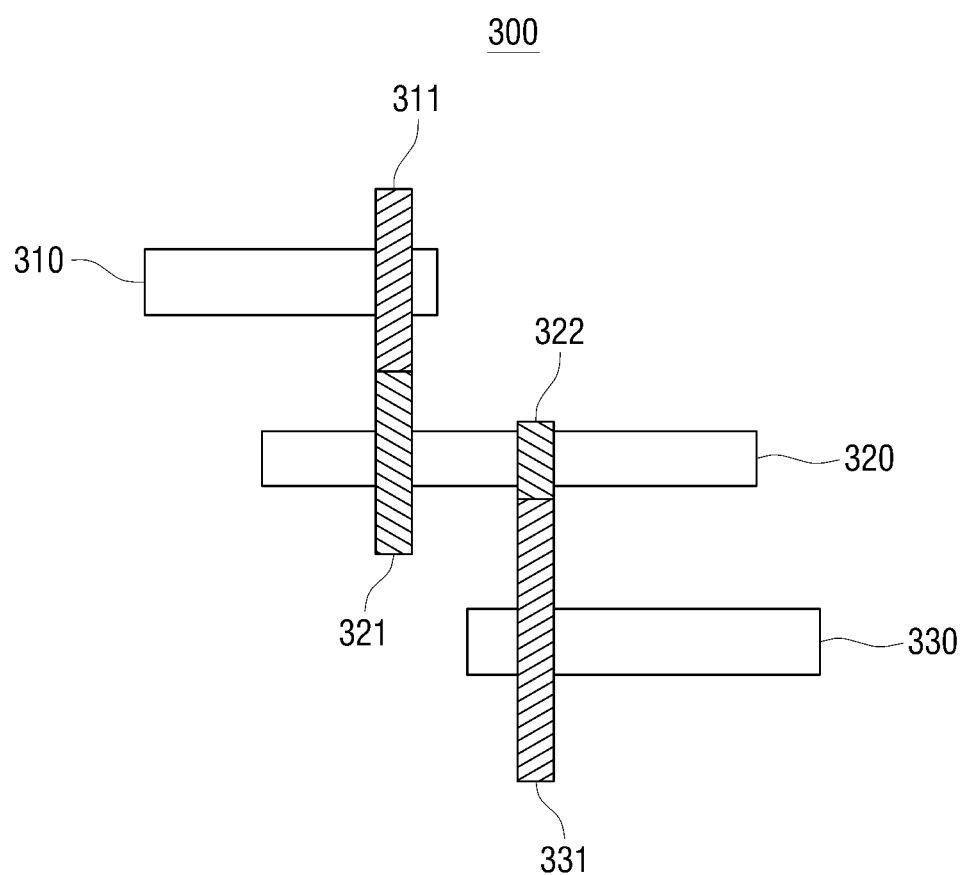
FIG. 6 is a schematic view illustrating a power transmitter according to another exemplary embodiment.

FIG. 6 illustrates a power transmitter 300 according to another exemplary embodiment. In the exemplary embodiment of FIG. 6, an expander and a compressor may be disposed so as for a driving shaft 310 and a driven shaft 330 to be parallel to each other, whereas in the exemplary embodiment of FIG. 5, the expander and the compressor are arranged so as for the driving shaft 310 and the driven shaft 330 to be in line with each other.

In the exemplary embodiment of FIG. 6, power from the expander is transmitted to the compressor in the same manner as in the exemplary embodiment of FIG. 5. As the driving shaft 310, which is the rotating shaft of the expander, is rotated, a connecting shaft 320 and the driven shaft 330 are rotated accordingly, and the compressor is operated by rotational power. A pump may receive power in the same manner as the compressor.

The power transmitter 300 of FIG. 6 differs from the power transmitter 300 of FIG. 5 only in that the driven shaft 330 is disposed below the connecting shaft 320. Accordingly, a user may determine the arrangement of the driving shaft 310 and the driven shaft 330 in consideration of the arrangement of the expander, the compressor, and the pump. For example, the driving shaft 310 of the expander and the driven shaft 330 of the compressor may be arranged to be in line with each other, as illustrated in FIG. 5, or to be parallel to each other, as illustrated in FIG. 6. The positions of the compressor and the pump may be switched. Alternatively, the driving shaft 310 of the expander, the compressor, and the driven shaft 330 of the pump may be arranged to all be parallel to one another.

Figure 7:
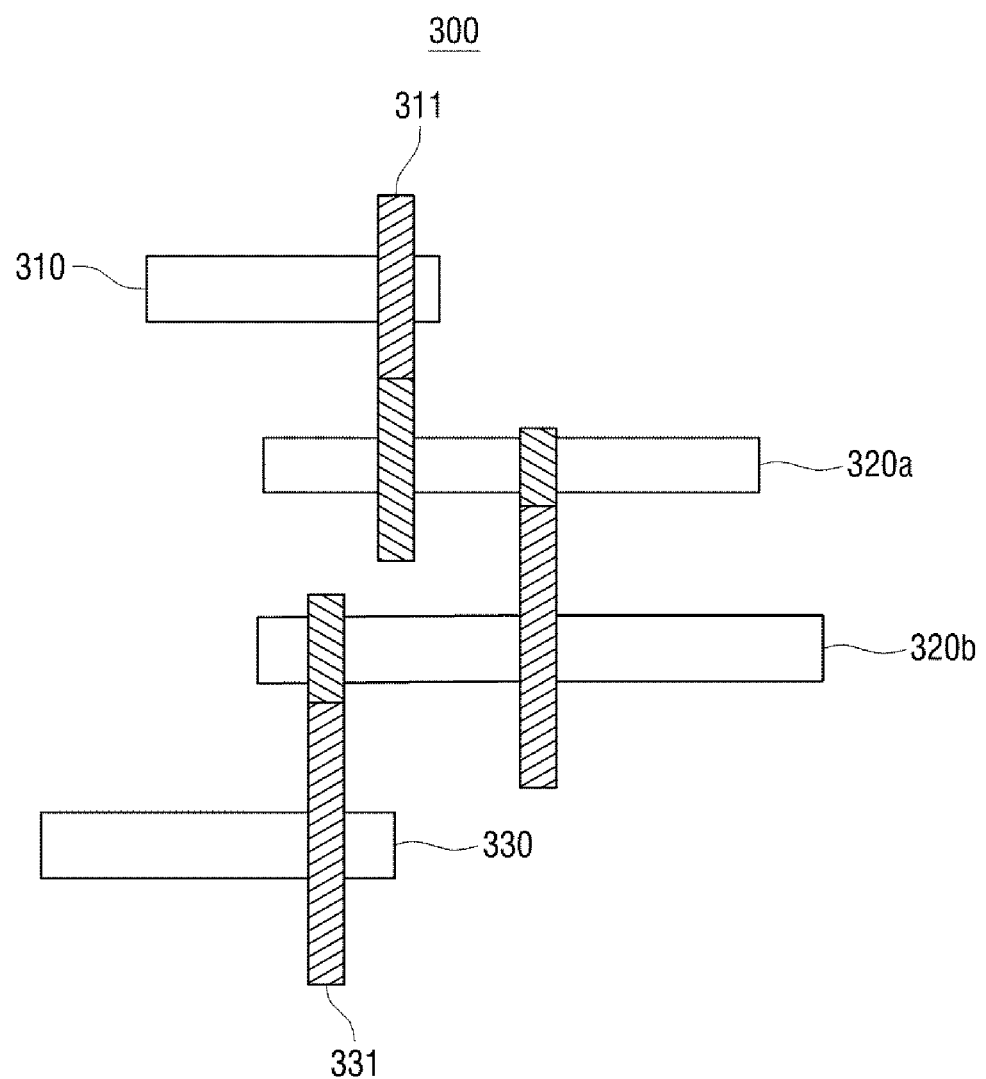
FIG. 7 is a schematic view illustrating a power transmitter according to another exemplary embodiment.

FIG. 7 illustrates a power transmitter 300 according to another exemplary embodiment. In the exemplary embodiment of FIG. 7, an expander, a compressor, and a pump may all be disposed on one side of the power transmitter 300, whereas in the exemplary embodiment of FIG. 5 or 6, the expander is disposed on one side of the power transmitter 300 and the compressor and the pump are disposed on the other side of the power transmitter 300.

Referring to FIG. 7, two connecting shafts, i.e., first and second connecting shafts 320a and 320b, are used to arrange the expander, the compressor, and the pump on one side of the power transmitter 300. The first connecting shaft 320a is disposed so as for a connecting gear to engage with a driving gear 311, and the second connecting shaft 320b is disposed so as for a connecting gear to engage with a driven gear 331. Since the direction of transmission of power is switched by the first and second connecting shafts 320a and 320b, the expander, the compressor, and the pump can be disposed on one side of the power transmitter 300.

As described above, the user can arrange an expander, a compressor, and a pump in various manners using the configuration of the power transmitter 300 of any one of FIGS. 5 through 7. In an example, the user may arrange a driving shaft 310 of an expander and a driven shaft 330 of a compressor to be in line with each other, as illustrated in FIG. 5, or to be parallel to each other, as illustrated in FIG. 6. In another example, the user may arrange the expander, the compressor, and the pump to be all disposed on one side of the power transmitter 300.

The high-efficiency power generation system according to an exemplary embodiment may include a plurality of compressors. In this case, the user can also arrange an expander and the plurality of compressors in various manners using the configuration of the power transmitter 300 of any one of FIGS. 5 through 7. In an example, the user may arrange a driving shaft 310 of an expander and a driven shaft 330 of one of the plurality of compressors to be in line with each other, as illustrated in FIG. 5, and may arrange the driving shaft 310 of the expander and the driven shaft 330 of another one of the plurality of compressors to be parallel to each other, as illustrated in FIG. 6.

Figure 8:
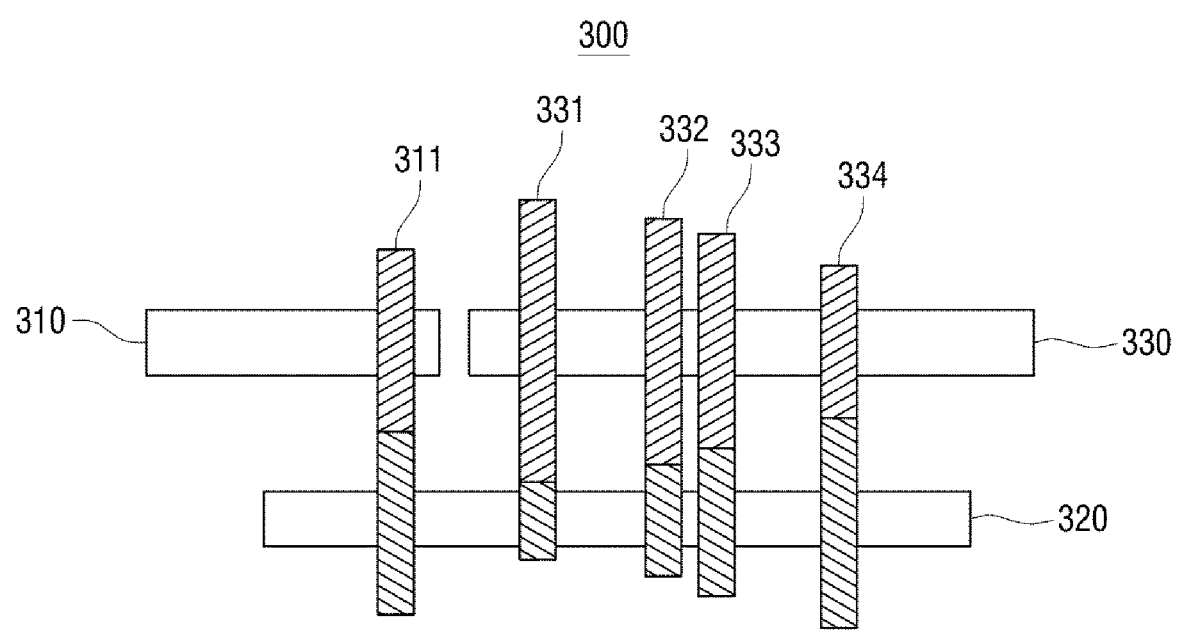
FIG. 8 is a schematic view illustrating a power transmitter according to another exemplary embodiment.

FIG. 8 illustrates a power transmitter 300 according to another exemplary embodiment. A principle regarding how the power transmitter 300 of FIG. 8 transmits power from an expander to a compressor and a pump is the same as a principle regarding how the power transmitter 300 of FIG. 5 transmits power from the expander to the compressor and the pump, but in the power transmitter 300 of FIG. 8, unlike in the power transmitter 300 of FIG. 5, a driven shaft 330 includes a plurality of driven gears 331, 332, 333 and 334 having different numbers of teeth. Accordingly, the rotational speed of the driven shaft 330 of the power transmitter 300 of FIG. 7 can be controlled.

Referring to FIG. 8, the power transmitter 300 may include a rotary transmission for controlling rotational speed of the driven shaft 330. A sliding gear-type transmission, a constant mesh-type transmission, or a synchromesh-type transmission may be used, as the rotary transmission, to allow one of the plurality of driven gears 331, 332, 333 and 334 to rotate the driven shaft 330. For convenience, the rotary transmission will hereinafter be described as being a synchromesh-type transmission.

The rotary transmission controls the rotational speed of the driven shaft 330 by causing one of the plurality of driven gears 331, 332, 333 and 334 having different numbers of teeth to rotate the driven shaft 330. The rotational speed of the driven shaft 330 is controlled in accordance with a ratio of the number of teeth of a driving gear 311 to the number of teeth of the driven gear that rotates the driven shaft 330.

FIG. 8 illustrates an example in which four driven gears having different numbers of teeth are provided. Referring to FIG. 8, a first driven gear 331 may have 80 teeth, a second driven gear 332 may have 52 teeth, a third driven gear 333 may have 32 teeth, a fourth driven gear 334 may have 20 teeth, and the driving gear 311 may have 32 teeth. In a case where a synchronizer fixes the first driven gear 331 to the driven shaft 330, the driven shaft 330 may rotate at a gear ratio of 2.5 with respect to the driving shaft 310. In a case where the third driven gear 333 is fixed to the driving shaft 333 by the synchronizer, the driven shaft 330 may rotate at a gear ratio of 1 with respect to the driving shaft 310. Accordingly, the rotational speed of the driven shaft 330 can be controlled by controlling the numbers of teeth of the plurality of driven gears 331, 332, 333 and 334 in accordance with a desired gear ratio.

Figure 9:
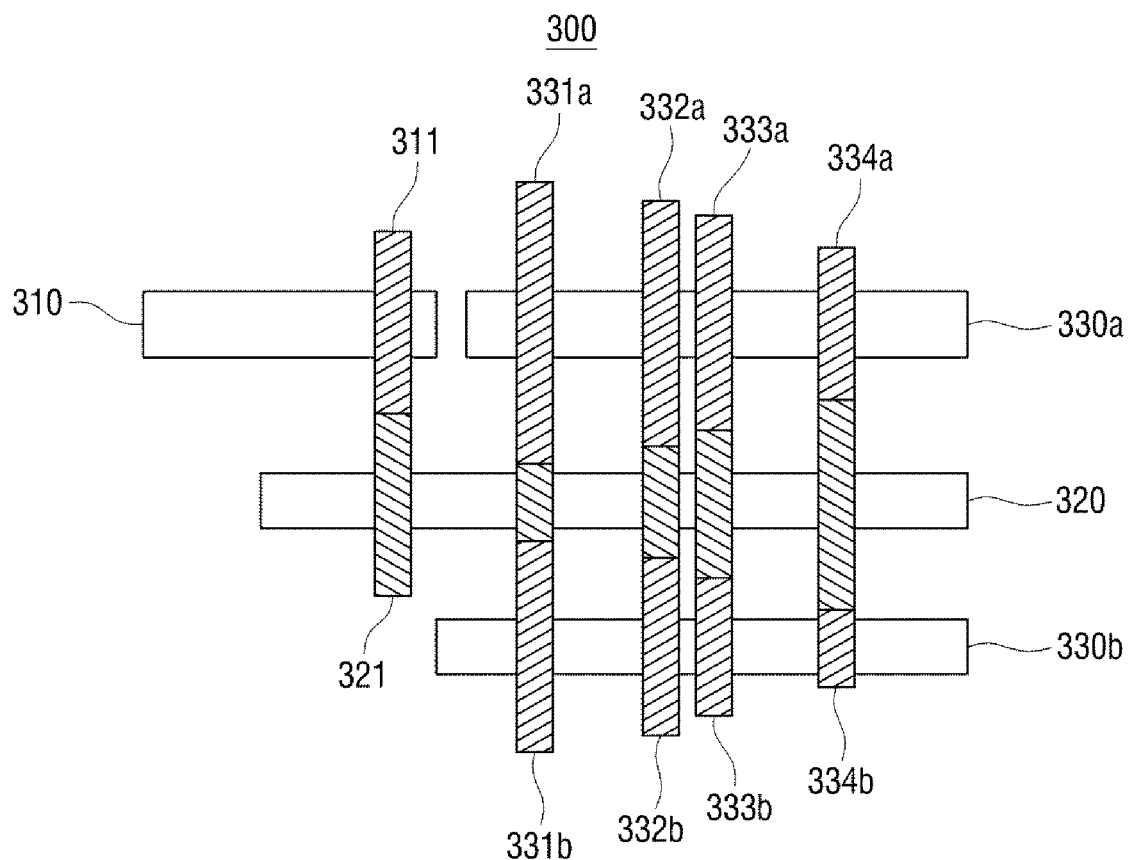
FIG. 9 is a schematic view illustrating a power transmitter according to another exemplary embodiment.

FIG. 9 illustrates a power transmitter 300 according to another exemplary embodiment. Referring to FIG. 9, a first driven shaft 330a may be the rotating shaft of a compressor, and a second driven shaft 330b may be the rotating shaft of a pump.

A rotary transmission can control rotational speed of the first and second driven shafts 330a and 330b separately by independently operating synchronizers installed at the first and second driven shafts 330a and 330b. For example, assuming that the power transmitter 300 has the same gear teeth settings as the power transmitter 300 of FIG. 8, if a second driven gear 332a of the first driven shaft 330a is selected by a synchronizer installed at the first driven shaft 330a, and a fourth driven gear 334b of the second driven shaft 330b is selected by a synchronizer installed at the second driven shaft 330b, the first and second driven shafts 330a and 330b may rotate at gear ratios of 1.6 and 0.6, respectively.

Alternatively, if a plurality of compressors are provided, rotating shafts of the plurality of compressors may be configured to be shifted at the same speed. The rotary transmission may collectively control synchronizers, installed at a plurality of driven shafts, to fix driven gears having the same number of teeth to driven shafts, and may thus allow the driven shafts to be shifted at the same rotational speed.

Figure 10:
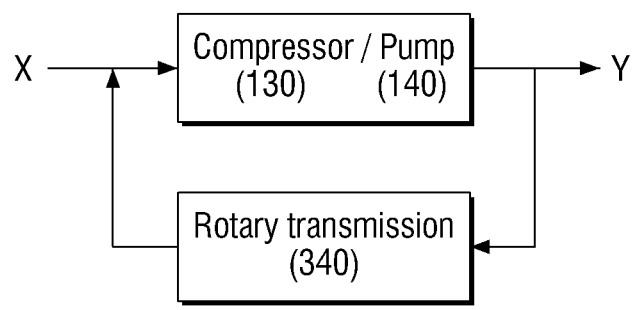
FIG. 10 is a schematic view illustrating a method of controlling the rotational speed of a rotary transmission according to an exemplary embodiment.

FIG. 10 illustrates how a rotary transmission 340 controls rotational speed. The rotary transmission 340 may automatically control the rotational speed of a driven shaft 330 in accordance with power required by a compressor 130.

The rotary transmission 340 may receive revolutions per minute (RPM) data Y of the driven shaft 330 as feedback. In a case where the RPM of the driven shaft 330 is too low to produce power required by the compressor 130, the rotary transmission 340 may select a driven gear capable of rotating the driven shaft 330 at an increased gear ratio X. On the other hand, in a case where the RPM of the driven shaft 330 is too high to produce power required by the compressor 130, the rotary transmission 340 may select a driven gear capable of rotating the driven shaft 330 at a decreased gear ratio X. Similarly, the rotary transmission 340 may automatically control the rotational speed of the driven shaft 330 in accordance with power required by a pump 140.

The rotary transmission 340 may be operated manually by a user. In response to the user manipulating the rotary transmission 340 to select a driven gear for rotating the driven shaft 330, the driven shaft 330 may be able to rotate at a selected gear ratio.

Figure 11:
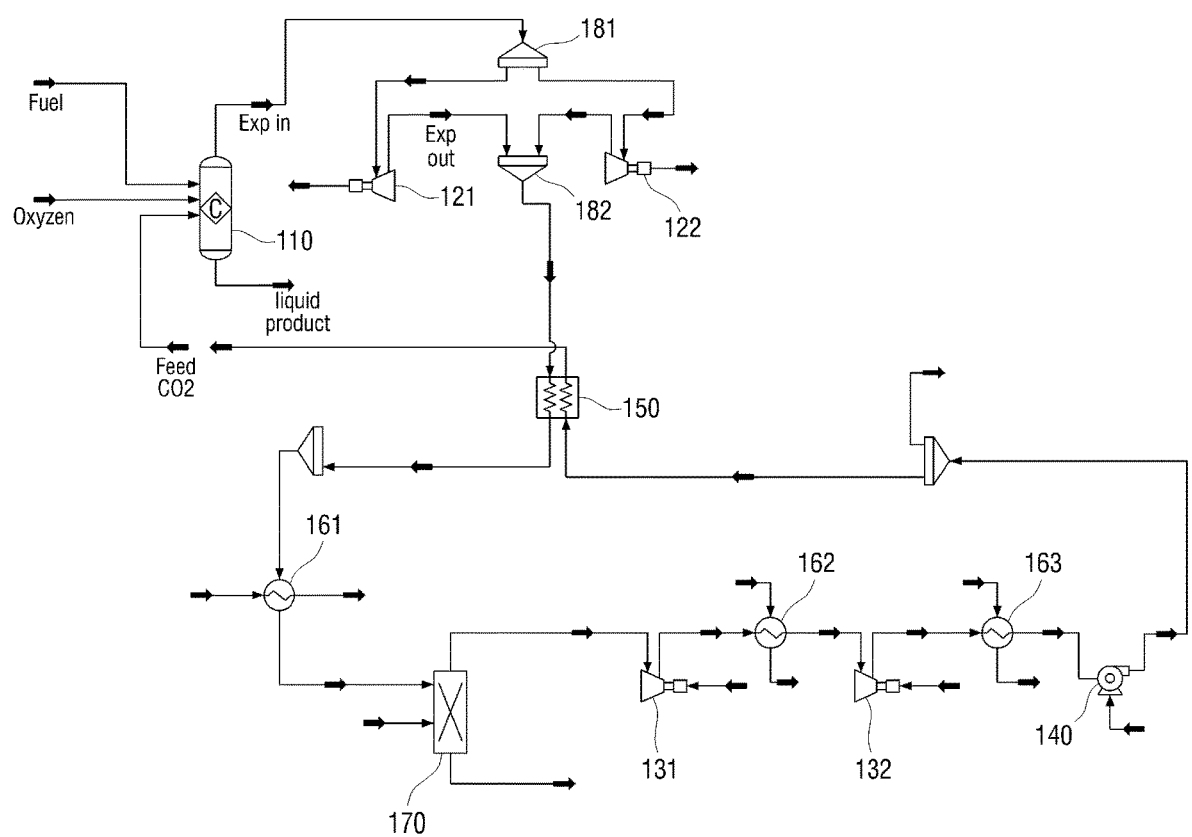
FIG. 11 is a schematic view illustrating a high-efficiency power generation system according to another exemplary embodiment.

FIG. 11 illustrates a high-efficiency power generation system according to another exemplary embodiment. In the high-efficiency power generation system of FIG. 3, rotational power from the expander 120 is transmitted not only to the power generator but also to the compressor 130 and the pump 140. This type of configuration, however, requires excessive rotational power from the expander 120, and may thus overload the expander 120. In order to prevent this, in the exemplary embodiment of FIG. 11, two expanders, i.e., first and second expanders 121 and 122, are provided.

Referring to FIG. 11, the high-efficiency power generation system includes a combustor 110, the first and second expanders 121 and 122, a circulating fluid distributor 181, a circulating fluid merger 182, a power generator, compressors 131 and 132, a pump 140, a heat exchanger 150, a water separator 170, and a power transmitter. The combustor 110, the power generator, the compressors 131 and 132, the pump 140, the heat exchanger 150, and the water separator 170 are almost the same as their respective counterparts of FIG. 3, and thus, detailed descriptions thereof will be omitted. Also, the power transmitter is as described above with reference to FIGS. 4 through 10, and thus, a detailed description thereof will be omitted.

The first expander 121 is connected to the power generator and transmits power for producing electricity to the power generator. The second expander 122 transmits power to the compressors 131 and 132 and the pump 140 via the power transmitter. Since the first and second expanders 121 and 122 are separately used to transmit power to the compressors 131 and 132 and the pump 140, the load of each of the first and second expanders 121 and 122 can be reduced, as compared to the exemplary embodiment of FIG. 3.

The circulating fluid distributor 181 divides flow of a circulating fluid ejected from the combustor 110, and distributes the circulating fluid to the first and second expanders 121 and 122, respectively. Specifically, the circulating fluid distributor 181 may control a ratio at which the circulating fluid is distributed in accordance with amounts of power required by the compressors 131 and 132 and the pump 140. For example, if turbines of the first and second expanders 121 and 122 are of the same specifications and the power required by the power generator is 10 times higher than the power required by the compressors 131 and 132 and the pump 140, the circulating fluid distributor 181 may distribute the circulating fluid to the first and second expanders 121 and 122 at a corresponding ratio.

The circulating fluid distributed by the circulating fluid distributor 181 is combined back into a single flow in the circulating fluid merger 181 through the first and second expanders 121 and 122. The combined circulating fluid may circulate in the same manner as in the exemplary embodiment of FIG. 3, passing through the heat exchanger 150, a cooler 160, the water separator 170, the compressors 131 and 132, and the pump 140.

The second expander 122, the compressors 131 and 132, and the pump 140 may be arranged in various manners using a configuration of the power transmitter 300 of any one of FIGS. 5 through 9. For example, in a case where the power transmitter 300 of FIG. 9 is used, a rotating shaft of the second expander 122 may become the driving shaft 310 of the power transmitter 300, a rotating shaft of a first compressor 131 may become the first driven shaft 330a of the power transmitter 300, a rotating shaft of the pump 140 may become the second driven shaft 330b of the power transmitter 300, the second expander 122 and the first compressor 131 may be arranged so as for the driving shaft 310 and the first driven shaft 330a to be in line with each other, and the second expander 122 and the pump 140 may be arranged so as for the driving shaft 310 and the second driven shaft 330b to be parallel to each other.

Figure 12:
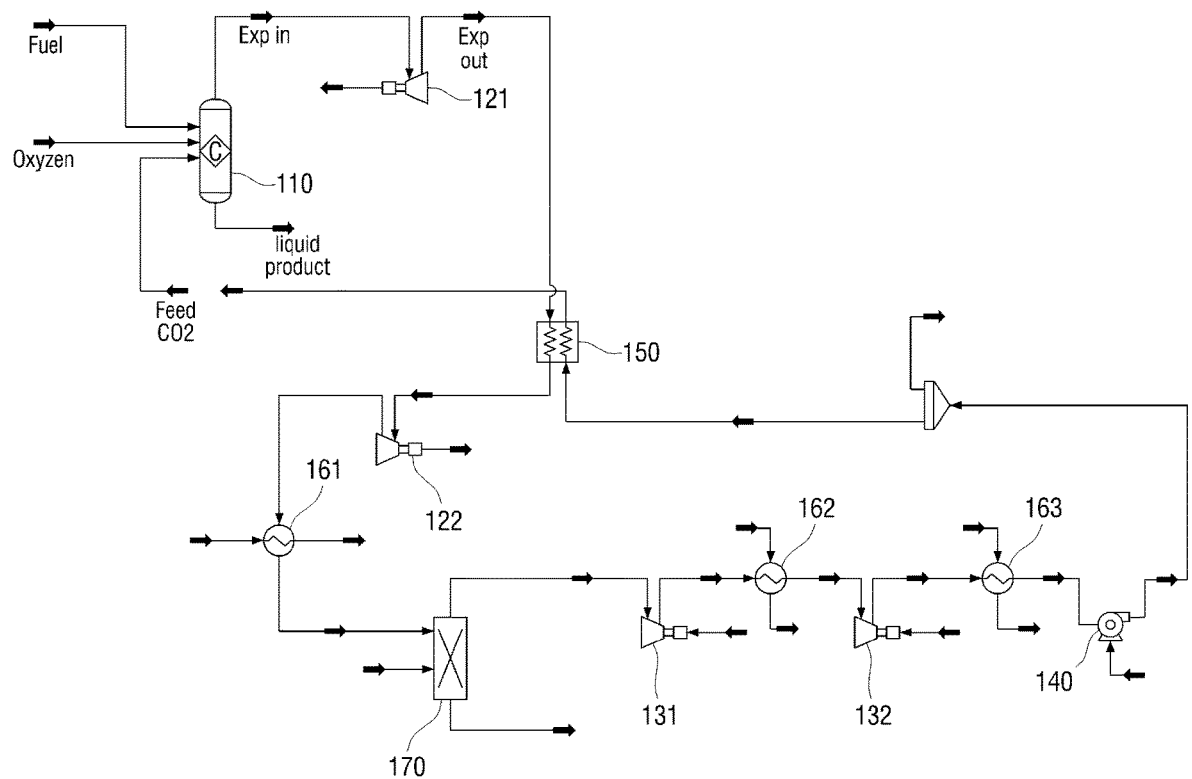
FIG. 12 is a schematic view illustrating a high-efficiency power generation system according to another exemplary embodiment.

FIG. 12 illustrates a high-efficiency power generation system according to another exemplary embodiment. Referring to FIG. 12, a second expander 122 is disposed at a rear end of a heat exchanger 150 so as to increase energy efficiency of the entire high-efficiency power generation system in consideration that the lower the temperature of a circulating fluid injected into compressors 131 and 132, the higher the efficiency of the compressors 131 and 132.

The high-efficiency power generation system of FIG. 12 includes a combustor 110, a first expander 121, the second expander 122, a power generator, the compressors 131 and 132, a pump 140, the heat exchanger 150, a water separator 170, and a power transmitter. The combustor 110, the power generator, the compressors 131 and 132, the pump 140, the heat exchanger 150, and the water separator 170 are almost the same as their respective counterparts of FIG. 3, and thus, detailed descriptions thereof will be omitted. Also, the power transmitter is as described above with reference to FIGS. 4 through 10, and thus, a detailed description thereof will be omitted.

In the exemplary embodiment of FIG. 12, like in the exemplary embodiment of FIG. 11, the first expander 121 is connected to the power generator and transmits power for producing electricity to the power generator, and the second expander 122 transmits power to the compressors 131 and 132 and the pump 140 via the power transmitter. However, in the exemplary embodiment of FIG. 12, unlike in the exemplary embodiment of FIG. 11, the second expander 122 is disposed at the rear end of the heat exchanger 150, rather than at the rear end of the combustor 110. Accordingly, the temperature of the circulating fluid is further lowered by the second expander 122 at the rear end of the heat exchanger 150, and as a result, the efficiency of the entire high-efficiency power generation system can be increased because the lower the temperature of the circulating fluid injected into the compressors 131 and 132, the higher the efficiency of the compressors 131 and 132.

The second expander 122 and the compressors 131 and 132 may be arranged in accordance with a structure of the power transmitter. For example, in a case where the power transmitter 300 of FIG. 9 is used, a rotating shaft of the second expander 122 may become the driving shaft 310 of the power transmitter 300, a rotating shaft of a first compressor 131 may become the first driven shaft 330a of the power transmitter 300, a rotating shaft of the pump 140 may become the second driven shaft 330b of the power transmitter 300, the second expander 122 and the first compressor 131 may be arranged so as for the driving shaft 310 and the first driven shaft 330a to be in line with each other, and the second expander 122 and the pump 140 may be arranged so as for the driving shaft 310 and the second driven shaft 330b to be parallel to each other. Alternatively, in a case where the power transmitter 300 of FIG. 6 is used, the second expander 122, the first compressor 131, and the second compressor 132 may be arranged so as for the driving shaft 310, the first driven shaft 330a, and the second driven shaft 330b to all be parallel to one another.

Figure 13:
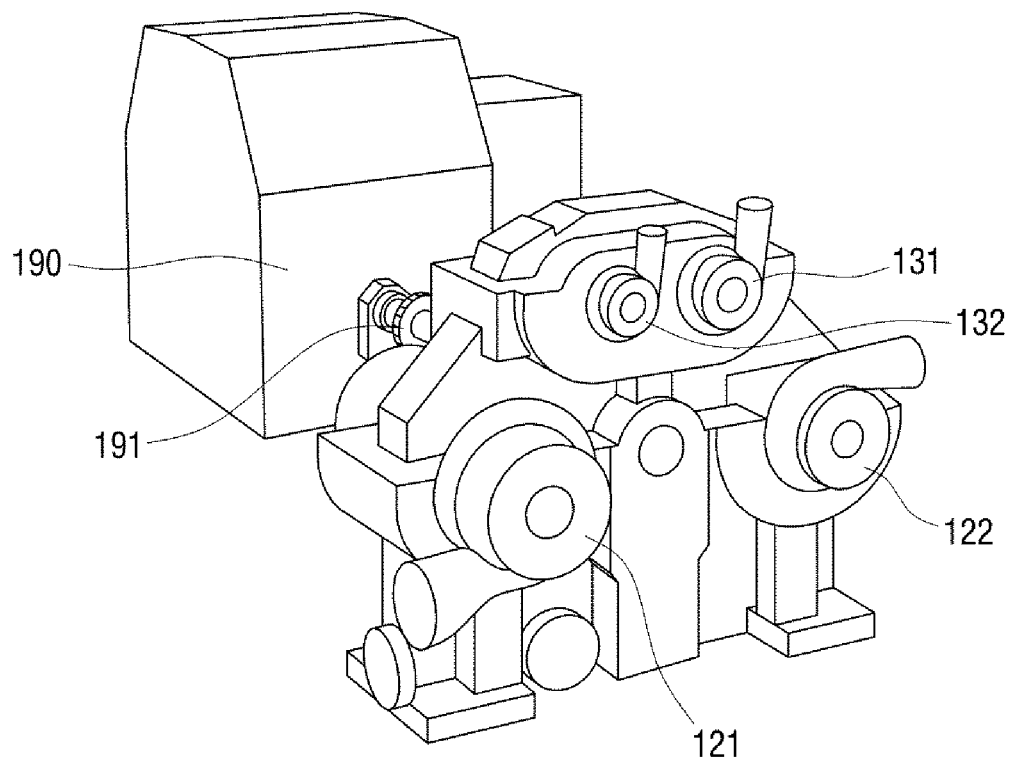
FIG. 13 is a perspective view illustrating a high-efficiency power generation system according to some exemplary embodiments.

FIG. 13 is a perspective view illustrating a high-efficiency power generation system according to some exemplary embodiments. Specifically, FIG. 13 is for a visual understanding of the high-efficiency power generation system according to the exemplary embodiment of FIG. 11 or 12.

Referring to FIG. 13, a first expander 121 transmits power to a power generator 190 via a power generator shaft 191, and a second expander 122 transmits power to first and second compressors 131 and 132 via a power transmitter. Although a pump is not illustrated in FIG. 13, the pump may also receive power from the second expander 122 in the same manner as the first and second compressors 131 and 132.

FIG. 13 is merely for a better understanding of the high-efficiency power generation system according to the exemplary embodiment of FIG. 11 or 12, and thus, the inventive concept is not limited thereto.

While exemplary embodiments are described above, it is not intended that these embodiments describe all possible forms of the inventive concept. Rather, the words used in the specification are words of description rather than limitation, and it is understood that various changes may be made without departing from the spirit and scope of the inventive concept. Additionally, the features of various implementing embodiments may be combined to form further exemplary embodiments of the inventive concept.

What is claimed is:

1. A high-efficiency power generation system comprising:
   a combustor configured to generate a circulating fluid by burning a fuel;
   an expander assembly comprising a first expander and a second expander arranged in parallel, the first and second expanders are configured to generate power by expanding the circulating fluid;
   a circulating fluid distributor disposed downstream of the combustor and configured to control a flow rate of the circulating fluid to each of the first and second expander;
   a power generator configured to generate electricity using the power generated by the expander assembly;
   a first compressor configured to compress the circulating fluid that is expanded by the expander assembly;
   a second compressor configured to compress the circulating fluid that is compressed by the first compressor;
   a pump configured to circulate the circulating fluid, that is compressed by the second compressor;
   a heat exchanger configured to allow the circulating fluid passing through the expander assembly and the circulating fluid passing through the second compressor to exchange heat with each other; and
   a power transmitter comprising a driving shaft, and configured to rotate driven shafts, which comprise shafts of the first compressor, the second compressor, and the pump, to transmit the power generated by the expander assembly to the first compressor, the second compressor, and the pump such that the first compressor and the second compressor compress the circulating fluid and the pump circulates the circulating fluid, that is compressed by the first compressor and the second compressor, to the combustor via the heat exchanger.

2. The high-efficiency power generation system of claim 1,
   wherein the power transmitter comprises a driving gear mounted on the driving shaft, a driven gear mounted on at least one of the driven shafts, connecting gears engaging between the driving gear and the driven gear, and a connecting shaft on which the connecting gears are mounted, and
   wherein, in response to the driving shaft being rotated by the power generated by the expander assembly, the connecting gears, the driven gear, and the driven shafts are rotated in accordance with the rotation of the driving gear to transmit the power generated by the expander assembly to the first compressor, the second compressor, and the pump.

3. The high-efficiency power generation system of claim 2,
   wherein the driven gear comprises a plurality of driven gears having different numbers of teeth, and
   wherein the power transmitter further comprises a rotary transmission configured to control rotational speed of the driven shafts in accordance with a ratio of the number of teeth of the driving gear to the number of teeth of each of the plurality of driven gears.

4. The high-efficiency power generation system of claim 3, wherein the rotary transmission is configured to control the rotational speed of a driven shaft, from among the driven shafts, connected to the first compressor or the second compressor and rotational speed of a driven shaft, from among the driven shafts, connected to the pump separately.

5. The high-efficiency power generation system of claim 3, wherein the rotary transmission is configured to automatically control the rotational speed of the driven shafts in accordance with power required by the first compressor, the second compressor, and the pump.

6. The high-efficiency power generation system of claim 3, wherein the rotary transmission is manually operated.

7. The high-efficiency power generation system of claim 1, wherein
   the power transmitter is configured to transmit the power, generated by the expander assembly, to the first compressor and the second compressor via the driving shaft and at least one of the driven shafts.

8. The high-efficiency power generation system of claim 1,
wherein the expander assembly and at least one from the first compressor and the second compressor are arranged such that the driving shaft and a driven shaft, from among the driven shafts, connected to the at least one from among the first compressor and the second compressor are in line with each other, and
wherein the expander assembly and the pump are arranged such that the driving shaft and a driven shaft, from among the driven shafts, connected to the pump are parallel to each other.

9. The high-efficiency power generation system of claim 1, wherein the expander assembly, the first compressor, the second compressor, and the pump are arranged such that the driving shaft and the driven shafts are parallel to each other.

10. The high-efficiency power generation system of claim 1,
wherein the first and second expanders disposed at a rear end of the combustor,
wherein power generated by the first expander is transmitted to the power generator, and
wherein power generated by the second expander is transmitted to the first compressor, the second compressor, and the pump via the power transmitter.

11. The high-efficiency power generation system of claim 10, wherein the circulating fluid distributor is configured to control a ratio at which the circulating fluid is distributed to the first and second expanders, respectively.

12. The high-efficiency power generation system of claim 1, further comprising a circulating fluid merger configured to merge the circulating fluid that is expanded by the first expander and second expander.

13. A method of operating a high-efficiency power generation system, the method comprising:
generating, by a combustor, a circulating fluid by burning a fuel;
generating, by an expander assembly that comprises a first expander and a second expander arranged in parallel, power by expanding the circulating fluid;
controlling, by a circulating fluid distributor disposed downstream of the combustor, a flow rate of the circulating fluid to each of the first and second expander,
compressing, by a first compressor, the circulating fluid that is expanded;
compressing, by a second compressor, the circulating fluid that is compressed by the first compressor;
circulating, by a pump, the circulating fluid that is compressed by the second compressor;
rotating, by a power transmitter that comprises a driving shaft, shafts of the first compressor, the second compressor, and the pump to transmit the generated power to the first compressor, the second compressor, and the pump such that the first compressor and the second compressor compress the circulating fluid and the pump circulates the circulating fluid, that is compressed by the first compressor and the second compressor, to the combustor,
wherein the expander assembly is further configured to transmit the generated power to an external power generator.

* * * * *